United States Patent

[11] 3,593,700

| [72] | Inventor | John V. McNulty<br>Norwich, N.Y. |
|---|---|---|
| [21] | Appl. No. | 777,942 |
| [22] | Filed | Oct. 3, 1968 |
| [45] | Patented | July 20, 1971 |
| [73] | Assignee | George P. Kingsley<br>Holland Patent, N.Y.<br>Continuation-in-part of application Ser. No. 568,854, July 29, 1966, now abandoned, and a continuation-in-part of 572,138, Aug. 12, 1966, now Patent No. 3,459,169. |

[54] CHAIN SAW FOR SAWING VERY HARD MATERIAL AND METHOD OF SAWING
7 Claims, 9 Drawing Figs.

[52] U.S. Cl.................................................. 125/21,
51/267
[51] Int. Cl....................................................... B28d 1/08,
B24b 55/02
[50] Field of Search............................................ 51/267;
125/12, 21; 143/32, 158

[56] References Cited
UNITED STATES PATENTS

| 2,367,107 | 1/1945 | Emmons...................... | 51/135 |
| 1,063,380 | 6/1913 | Peirce ......................... | 125/13 |
| 2,869,534 | 1/1959 | Stihl............................ | 125/21 |
| 1,043,433 | 11/1912 | Jackson....................... | 125/21 |
| 1,903,571 | 4/1933 | Meyer......................... | 143/32 |
| 2,746,495 | 5/1956 | Greenlaw..................... | 143/158 |
| 624,400 | 5/1899 | Surgi........................... | 299/36 |

FOREIGN PATENTS

| 815,631 | 7/1959 | Great Britain................ | 125/21 |

*Primary Examiner*—Harold D. Whitehead
*Attorney*—Wenderoth, Lind & Ponack

ABSTRACT: A method and apparatus for cutting very hard materials such as reinforced concrete. A chain saw has a chain formed of tooth members with very hard particles projecting from the teeth, the teeth running in a groove around a bar. As the chain is driven by a motor means, a low-pressure stream of liquid, such as water, is directed along a straight run of the chain. The liquid will cling to the chain and move at substantially the velocity of the chain, and will act to sweep particles of the material being sawed out of the kerf, as well as cool the chain and lubricate it. The saw can also have a nose wheel with circular blades on either side thereof for making plunge cuts.

PATENTED JUL20 1971

INVENTOR
JOHN V. McNULTY

BY Wenderoth, Lind & Ponack
ATTORNEYS

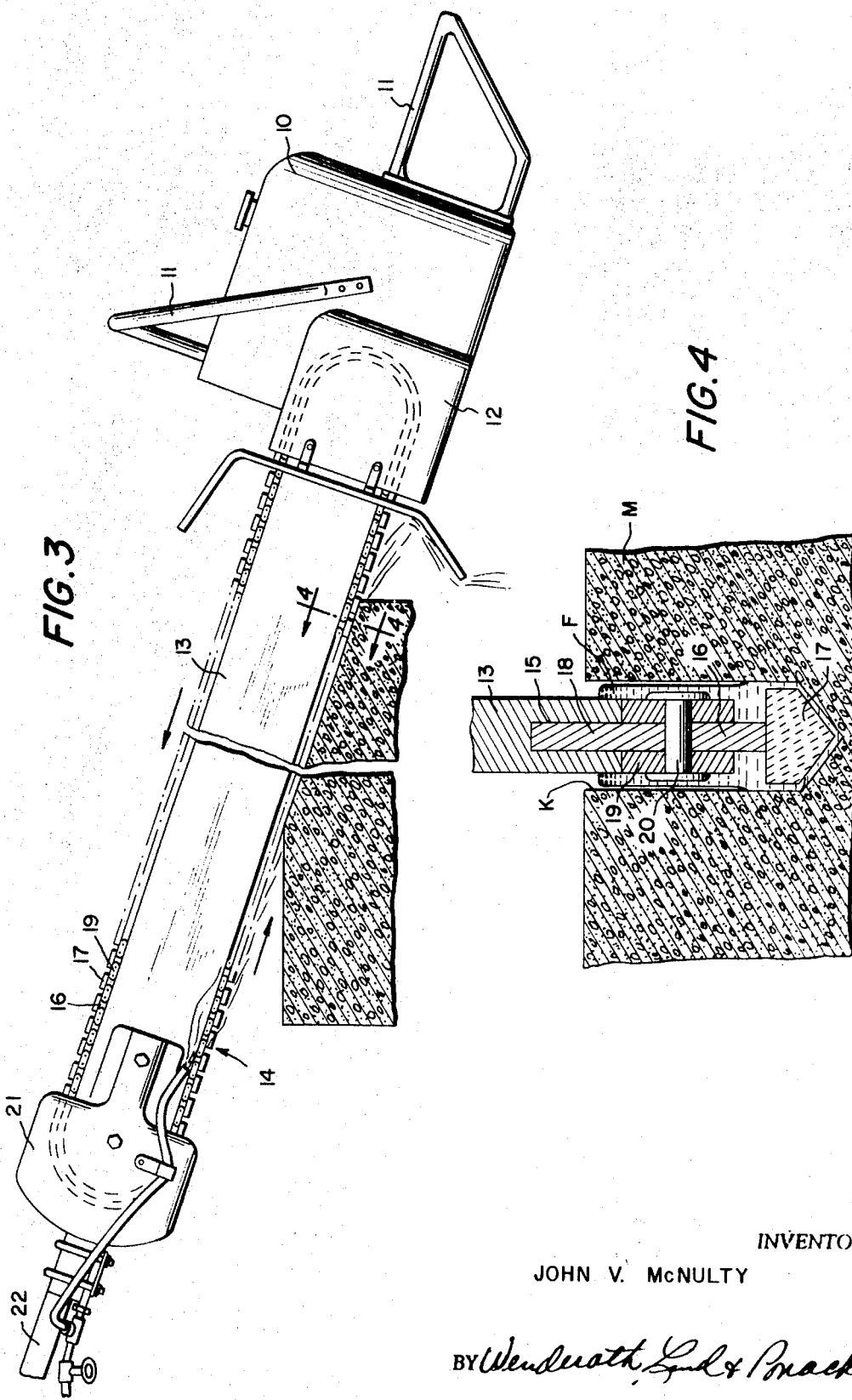

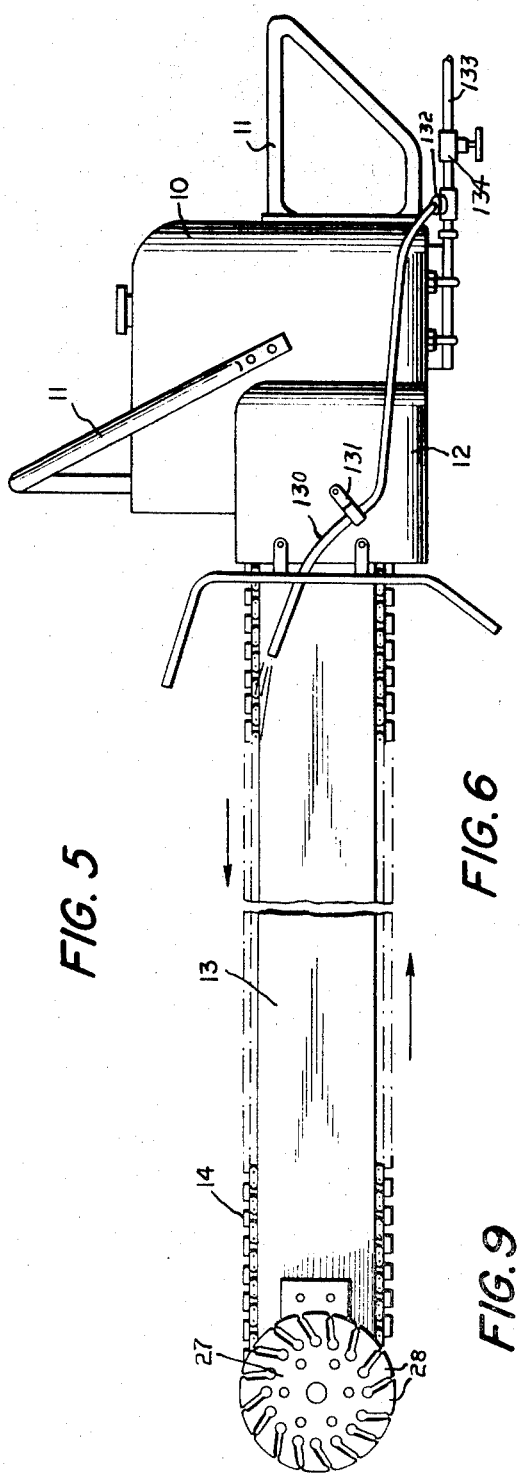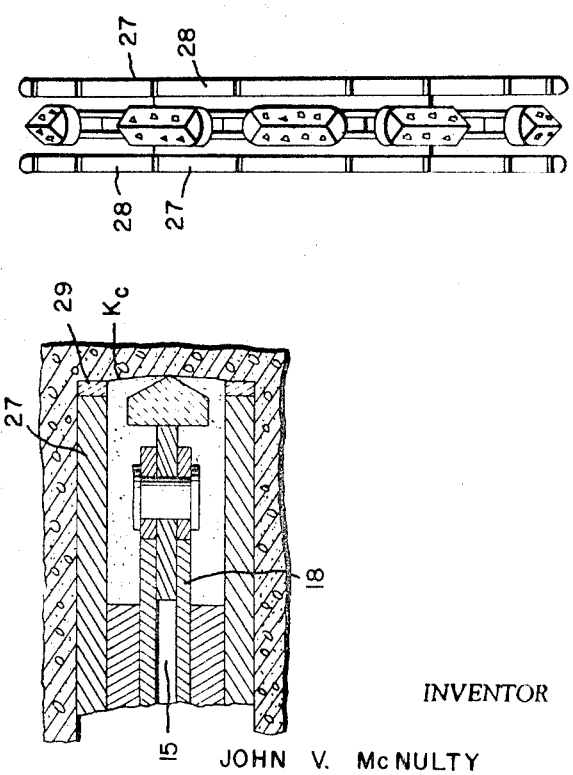

INVENTOR
JOHN V. McNULTY 3,593,700

1

CHAIN SAW FOR SAWING VERY HARD MATERIAL AND METHOD OF SAWING

This application is a continuation-in-part of applications Ser. No. 568,854 filed July 29, 1966 now abandoned, and Ser. No. 572,138, filed Aug. 12, 1966, now U.S. Pat. No. 3,459,169.

The present invention relates to a chain saw for sawing very hard materials, such as reinforced concrete or stone, or the like, and a method of sawing such materials, and more particularly it relates to such a chain saw which has a stream of liquid, such as water, directed along the run of the chain which is cutting for cooling, lubricating, and washing the material out of the kerf.

Heretofore the efforts to develop a chain-type saw for cutting concrete, stone, and the like have been largely directed to designs for teeth, and most of these teeth have been of the type in which diamonds are embedded in a matrix of a softer material such as a specially heat-treated metal. A good example of this type of development is found in U.S. Pat. No. 2,912,968 to Stihl. The art has also recognized a need to supply water or some other liquid to the kerf where the chain teeth meet the material being cut, the Stihl patent showing channels within the bar of the chain saw through which water is supplied to the kerf apparently from beneath the chain. To the same effect in the U.S. Pat. No. 3,176,675 to Bomba, which shows both a reciprocating and circular saw in which a chamber is provided behind the teeth of the saw blade through which water under pressure is directed into the kerf to wash out the particles of material which are removed by the saw teeth.

Such constructions, however, are rather complicated, and do not lend themselves readily to economical and physically strong bars for chain saws, and in fact when the water is directed as shown in these patents, do not act to produce efficient removal of the particles of material which are removed by the teeth on the saw and at the same time cool and lubricate the saw teeth as they run in a chain on the bar.

It is an object of the present invention to provide a simple method and apparatus for cutting hard materials, such as concrete, stone and the like, which overcomes the disadvantages of the prior art devices, yet which is economical to construct and use and which enable concrete, stone and like materials to be cut rapidly and efficiently, both from an economic standpoint as well as from the standpoint of the time and effort involved.

It is a further object of the present invention to provide a method of cutting hard materials, such as concrete and stone and the like, which employs a stream of water and the so-called Coanda or "wall" effect to direct the stream of water along the bar and chain of a chain saw in the direction in which the chain is running and cause it to lubricate the chain as it runs along the bar, cool the chain and bar, and at the same time wash the particles removed from the material being sawed out of the kerf quickly and efficiently.

It is a further object of the present invention to provide a chain-type saw which can be used to make a plunging cut. One embodiment of such a chain saw can also cut linearly, and thus can make both types of cuts efficiently.

An apparatus for carrying out the objects of the present invention comprises a chain saw having teeth with very hard particles, such as diamonds thereon and having means for directing a stream of water along the chain in the direction in which the chain is running in a straight run, whereby the stream of water is caused to cling to the chain and blade as it runs through the kerf in the material being sawed to lubricate the chain, cool the chain and bar, and at the same time wash the particles out of the kerf quickly and efficiently.

One embodiment of the chain saw of the present invention has a circular saw blade having diamond studded teeth on each side of the nose of the bar of this chain-type saw, the blades having a radius of curvature which is substantially the same as that of the path along which the points on the teeth move as the chain moves around the nose of the bar. These circular blades are driven from the movement of the chain, and perform a cutting action along lines parallel to the path of the chain. As a result, they make two parallel slots at the nose of the saw, while the chain which moves along between the blades removes the very hard material being cut from between the slots made by the saw blades. As a result, the saw can readily make a plunging cut through a very hard material, and can also be used to make a linear cut along the very hard material once the very hard material has been cut through.

In another embodiment, there is provided a so-called starting device which makes only a plunging cut. In such a device, the bar and chain are much shorter and the profile of the teeth on the chain as well as that of the circular blades is curved substantially the same as the curvature of the cut to be made.

Other and further objects of the present invention will become apparent from the following specification and claims, taken together with the accompanying drawings, in which:

FIG. 3 is a view similar to FIG. 1 showing the saw cutting concrete;

FIG. 4 is a sectional view, on an enlarged scale, taken on line 4—4 of FIG. 3 and showing in a somewhat exaggerated way the manner in which the stream of water flows along the bar and chain of the saw;

FIG. 5 is a side elevation view of another embodiment of a chain-type saw according to the present invention;

FIG. 6 is an end elevation view, on an enlarged scale, of the nose end of the chain type saw of FIG. 5;

FIG. 9 is a sectional view taken on line 6—6 of FIG. 8.

Figure 1:
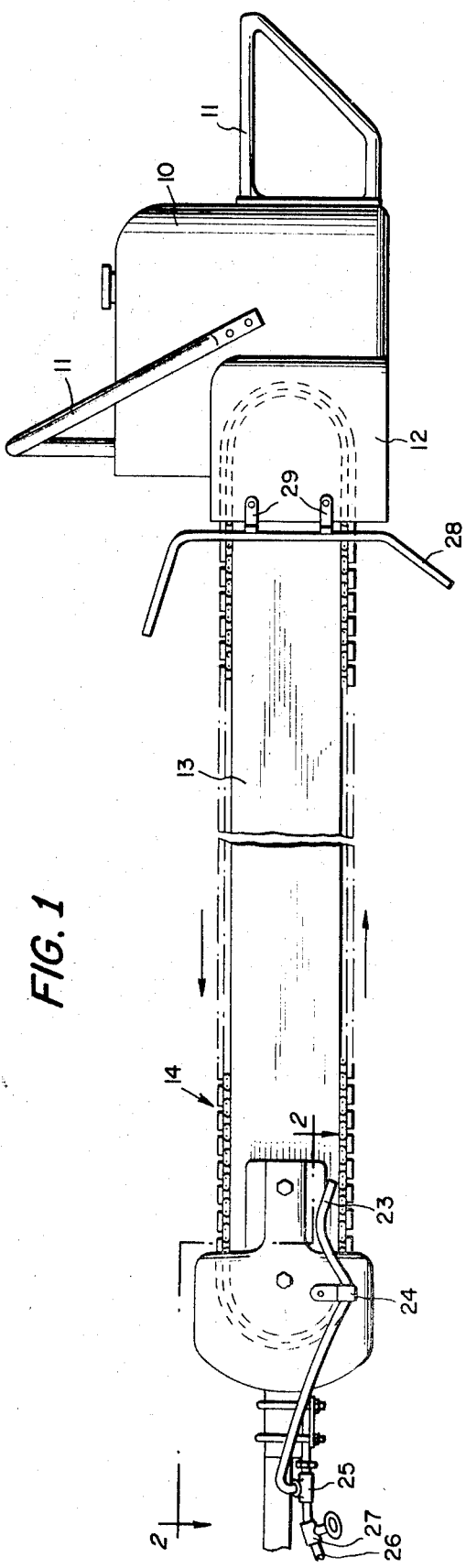
FIG. 1 is a side elevation view of a preferred embodiment of a chain saw according to the present invention.
Figure 2:
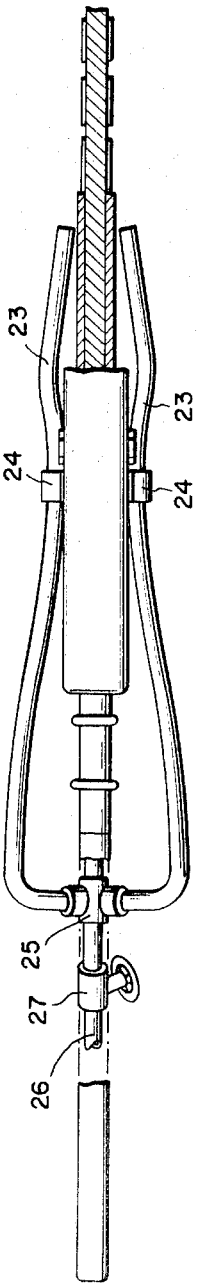
FIG. 2 is a top plan view, partly in section, of one end of the saw of FIG. 1, which view is taken on line 2—2 of FIG. 1.
Figure 7:
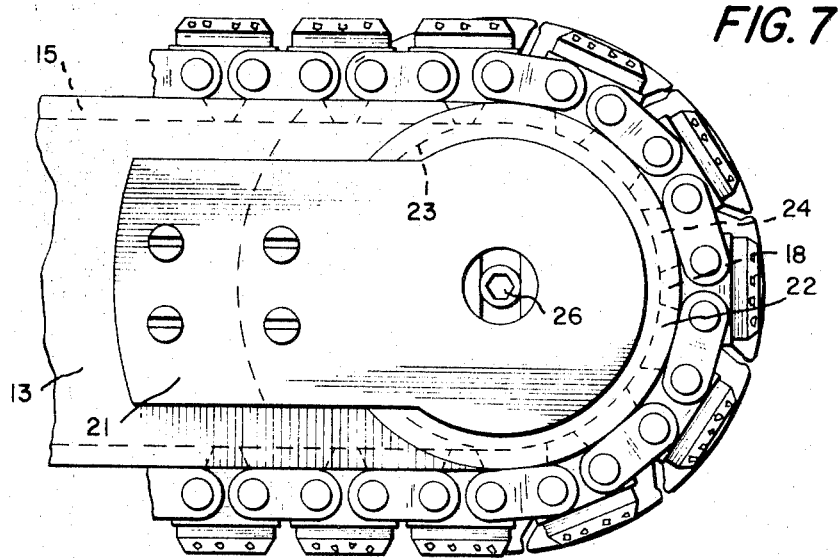
FIG. 7 is a side elevation view, on an enlarged scale, of the nose end of the chain-type saw of FIG. 5 with the circular saw blade on the near side of the bar removed.

The chain saw of the present invention comprises a conventional motor housing 10 which has the usual handles 11 thereon and in which is contained the driving motor for driving the chain. The particular saw shown has a gasoline-driven motor, but it will, of course, be understood that the drive could be any other kind, such as compressed air or electric. On the housing 10 is a bar mounting member 12 within which is housed the sprocket (not shown) for driving the chain in the direction indicated by the arrows, and mounted within the bar-mounting member 12 is the bar 13 along which runs the chain 14. The bar 13 has a groove 15 therein, and the chain is comprised of the usual tooth members 16, having cutting portions 17 thereon which have very hard particles, such as diamonds, projecting therefrom, and having a downwardly extending guide projection 18 which runs in the groove 15 and is guided by the groove. The tooth members 16 are connected by links 19 secured to the individual tooth members by rivets or pins 20.

Mounted on the nose end of the bar is a second or nose housing 21 to which is attached a bar-type handle 22 to enable a helper for the operator to handle the nose end of the saw in manipulating it during cutting operations. Within the nose housing 21 the chain runs around the nose of the bar, either in the groove 15 or in a nose wheel (not shown) rotatably mounted in the nose end of the bar. On the upper and lower edges of the bar the chain runs in an upper and lower straight run.

Means are provided on the chain saw for directing a flow of water along the lower straight run of the chain 14 which is cutting the material to be cut, and in the direction in which the chain is running through the cut. In the present embodiment, this means comprises a pair of tubes 23, one mounted on each side of the nose housing 21 by means of a clamp 24. The open end of each of the tubes is directed slightly inwardly toward the bar 13 and slightly downwardly at a point just above the lower run of the chain at the nose end of the bar. The other ends of the tubes 23 are connected to a Y-branch fitting 25 at the end of a water supply pipe or hose 26 in which is a valve 27 for controlling the pressure at which the liquid is supplied to the tubes 23.

At the motor end of the bar 13 is a deflector shield 28 which is mounted on the bar-mounting member 12.

In operating the chain saw, the motor is actuated, and then the valve 27 is turned so as to direct water at relatively low-pressure from the tubes 23 against the bar 13 and the lower run of the chain 14. The water will, when it strikes the surface of the bar 13, fan out slightly, as shown in FIG. 3, and will run along the length of the bar for a short distance, the stream of water clinging due to the Coanda or "wall" effect. It should be pointed out that the stream of water should be at a relatively low pressure, because otherwise it will not cling, but rather will splash and bounce off the bar 13. The lower part of the fan of water will first be picked up by the moving chain 14 and eventually the whole of the stream of water will be picked up and driven along the bar 13, groove 13 and the links 19 and teeth 16 of the chain, and due to the velocity imparted by the chain, the Coanda or "wall" effect will cause the water to continue to cling to both the bar 13 and the chain while moving at substantially the velocity of the chain. As seen in exaggerated form in FIG. 4, the water forms a layer F around the lower edge of the blade 13 and the chain running therealong. It will also fill the space between the links 19, the small space between the surfaces of groove 15 and the guide projection 18 and the spaces between the teeth 16 and the links 19, so as to cool and lubricate these parts. In practice, it has been found that with the saw running at its normal operating speed and with only city water pressure on the tubes 23, the stream of water clings to the chain and the bar 13 for almost the full length of the bottom run of the chain.

The chain is then placed against the material M to cut, and as the teeth 16 on the chain move across the material M, they will cut into it by removing very small pieces of material therefrom. The stream F of water moving with the chain and at substantially the velocity of the chain and clinging to it will be carried into and wash through the kerf K which is formed by the action of the teeth, and will literally sweep away the particles removed from the bottom of the kerf K. The stream of water which comes out of the end of the kerf K at the downrun end of the chain is still more or less clinging to the chain, and strikes the shield 28 and is deflected downwardly. The shield thus protects the operator from being struck by this stream. The stream is substantially clear, and it is not until it falls into a sump or the like that it can be seen that the particles of material which are carried in it are settling out and have been fully removed from the kerf. This is, therefore, an indication that that the high velocity stream of water is removing the particles from the kerf as fast as they are formed rather than giving them a chance to accumulate and form a slurry, as is usually the case when water is simply poured into the top of the kerf to cool and lubricate.

In one practical embodiment of the saw of the present invention, a chain saw was driven by a compressed air motor so that the sprocket wheel has a velocity of 1,800 r.p.m. and the length of the bottom run of the chain was about 3 feet and the chain moved with a velocity of about 2,800 linear feet per minute. The teeth on the chain had diamonds embedded in a tungsten base alloy and were about three-fourths inch long and tapered as shown in cross section in FIG. 4, and having the ends slightly beveled. Water at city water pressure was supplied through two ¼-inch tubes. The tubes were adjusted until the water clung to the bar and chain for most of the lower run of the chain.

The material which was cut was concrete with a granite chip aggregate, and having reinforcing rods distributed at random throughout. The block was approximately 1 foot thick.

It was found that the chain saw could cut through the block at a rate of approximately 2 inches per minute and that the chain and bar remained quite cool. The chain cut right through the reinforcing rods. Extensive tests have shown that the chain can cut up to 150 linear feet of such material before the teeth have become too badly worn to be of further use. Wear and tear on the bar and the groove therein in which the chain runs is kept to a minimum.

It will, of course, be understood that the water stream need not be supplied exactly as shown and described herein. The tubes could be placed within the blade and they could, where no nose housing was provided, be mounted on the main housing 10 and extend within the blade to the nose thereof, or the direction of the chain could be reversed and the tubes simply mounted on the outside of the bar-mounting member 12. The essential feature of the tubes is that they direct the streams of water against and along the bar 13 so as to cling thereto and also along the chain so that they form a film around the chain. They can be adjustable so as to enable them to be changed to accommodate different operating conditions of the saw.

The embodiment of the chain saw of FIGS. 5—9 is for making plunge cuts as well as linear cuts. It also comprises a conventional motor housing 110 which has the usual handles 111 thereon, and in which is contained the driving motor for driving the chain. The particular saw shown has a gasoline-driven motor, but it will, of course, be understood that the drive could be any other kind, such as compressed air or electric. On the housing 110 is a bar-mounting 112 within which is housed the sprocket (not shown) for driving the chain in the direction indicated by the arrows, and mounted within the bar-mounting member 112 is the bar 113 along which runs the chain 114. The bar 113 has a groove 115 therein, and the chain is comprised of tooth members 116 having cutting portions 117 having a straight profile and an inverted V-shaped cross section and beveled end portions 117a and very hard particles, such as diamonds, projecting therefrom. The tooth members each have a downwardly extending guide projection 118 which runs in the groove 115 and is guided by the groove. The tooth members 116 are connected by links 119 secured to the individual tooth members by rivets or pins 120.

As part of the means for making plunge cuts, there is mounted on the nose end of the bar 113 by means of bolts or the like a nose wheel bracket 121 which has a nose wheel 122 rotatably mounted thereon. Nose wheel 122 has a groove 123 around the periphery thereof which is the same depth as the groove 115 in the bar 113, and with the nose wheel 122 in position, the groove 115 runs smoothly into the groove 123. Likewise, the outer peripheral surface of the nose wheel 122 is the same diameter as the width of the nose of the bar 113, so that the surface of the edges of the bar 113 runs smoothly into the peripheral surface of the nose wheel 122. In this way, the chain 114 is led around the nose of the bar by the guide projections 118 on the individual teeth running in the groove 123 and the links 119 running on the peripheral surface of the nose wheel. Positioned in the bottom of the groove 123 are sprocket projects 124 which are engaged with the guide projections 118 so that the nose wheel 122 is driven by the movement of the chain therearound.

A shaft 126 having a polygonal cross section is secured to the hose wheel 122 and is turned thereby, and mounted on the opposite ends thereof, i.e. on opposite sides of the nose wheel 122, and closely adjacent thereto are two circular saw blades 127 each having a plurality of teeth 128 thereon having diamonds or like hard particles projecting from a matrix 129 on the cutting portions on the ends of the teeth. The radius of the cutting portion of the circular saw blades 127 is substantially the same as the radius of the points of the tooth members where the apex of the inverted V-shaped cutting portions 117 are intersected by the beveled end portions 117a.

Figure 8:
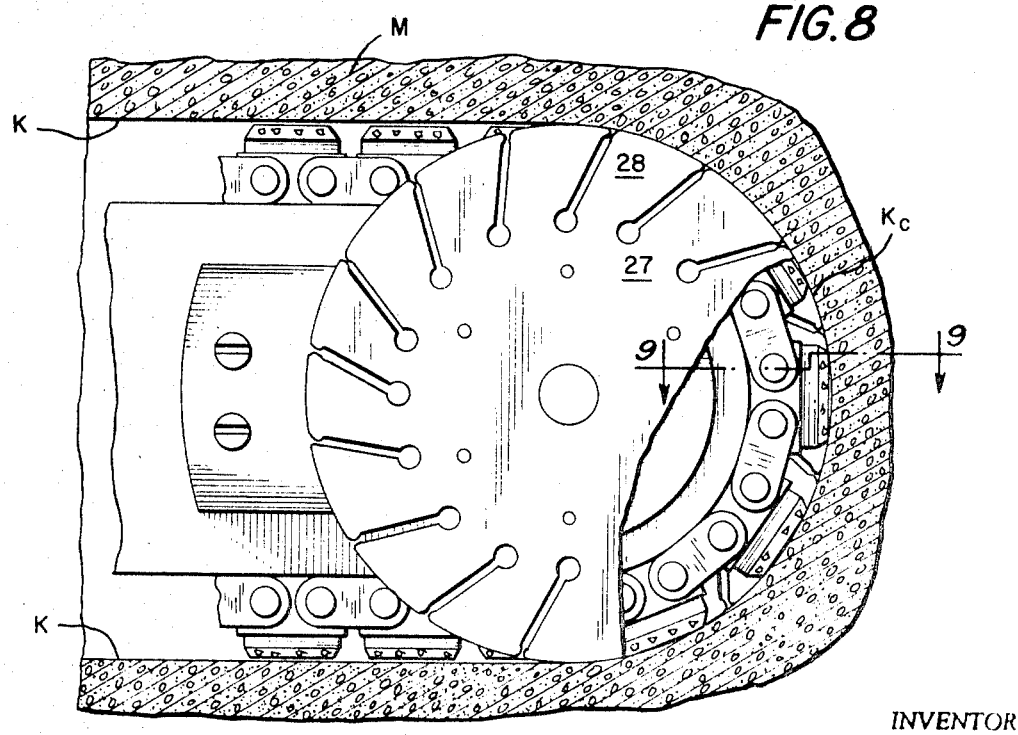
FIG. 8 is a view similar to FIG. 7 with the blade partly broken away and showing the saw in the process of making a plunging cut.

It will be seen from FIGS. 8 and 9 that the result of this arrangement is that when the chain 114 is moving along the nose wheel and driving it by the engagement of the projections 118 with the sprocket projections 124, the circular saw blades 127 rotate with the points of the tooth members 116 and the peripheral cutting portions of the teeth 128 on the circular saw blades 127 moving along substantially the same cylindrical surface. The cutting portions 117 of the teeth 116 act mostly to remove the material from between the slots cut by circular saw blades 127 to form a substantially cylindrically curved portion $k_c$ of the kerf K which is formed when the nose of the saw is forced against and into the material M to be cut. In practice, it has been found that with the arrangement as shown and described, a saw can readily cut through a twelve inch thick wall made of reinforced concrete in a matter of a few minutes.

It will, of course, be understood that once the plunging cut has been made through the complete thickness of the wall or similar structure, any further cut is preferably made with the straight run of the chain 114 along the bar 113. Thus, in cutting a door through a concrete wall, a plunging cut would first be made near the top of one vertical side edge of the door, using the plunge cutting means of the present invention, and then the vertical edge of the door opening would be cut using the straight bottom run of the chain. Then a second plunging cut could be made at one end of the top edge of the door and a second horizontal cut made using the straight run of the chain. Then a third plunging cut could be made at the top of the other vertical side edge of the door and that side edge cut.

As in the embodiment of FIGS. 1—4, means are provided for directing a flow of water or similar cooling and washing liquid along the upper straight run of the chain 114, which is moving into the material being cut, and in the direction in which the chain is running through the cut. In the present embodiment, this means comprises a pair of tubes 130, one mounted on each side of the bar mounting member 112 by means of a clamp 131. The open end of each of the tubes is directed slightly inwardly toward the bar 113 and slightly upwardly at a point just below the upper run of the chain at the motor housing end of the bar. The other ends of the tubes 130 are connected to a Y-branch fitting 132 at the end of a water supply pipe or hose 133 in which is a valve 134 for controlling the pressure at which the liquid is supplied to the tubes 130.

During the operation of the chain saw to make a plunging cut, the valve 133 is turned so as to direct water at relatively low pressure, e.g. city water pressure, from the tubes 130 against the surface of the bar 113 and the upper run of the chain 114. The water will, when it strikes the surface of the bar 113, fan out slightly, and will run along the length of the bar for a short distance, the water clinging due to the so-called Coanda or "wall" effect. Most of the water will be picked up by the moving chain 114 and driven along the bar 113, the groove 115 and the links 119 and teeth 116 of the chain, and due to the velocity imparted by the chain, the Coanda or "wall" effect will cause the water to cling to both the bar and the chain. A stream of water moving substantially at the chain velocity will thus be carried into the plunging cut, and when it reaches the point where the chain 114 starts around the nose wheel 122, the water will be driven against the bottom of the curved portion of the kerf $K_c$ and will sweep around this portion and rapidly sweep out all of the particles which have been removed from the material being cut by the toothed members 116 and saw blades 127. The stream of water will then move rapidly, being still somewhat under the influence of the rapidly moving chain, along the bottom surface of the kerf and will be discharged at the surface of the material being cut.

While the disclosed embodiment shows the tubes 130 as being positioned below the chain 114 and pointing upwardly toward it, it is, of course, possible to point the tubes downwardly at a slight angle to the direction of movement of the chain from a point slightly above the chain. It is also possible to have a tube just above the chain where it enters the material being cut and directed along the chain.

This embodiment of a chain-type saw can make a so-called plunging cut, yet has a chain which can make regular linear cuts efficiently. The chain saw of this embodiment of the invention, besides being of particular value to those engaged in the ordinary construction operation where cutting very hard materials is involved, is particularly valuable to those engaged in emergency-type operations, such as rescue operations where it is necessary to break through a concrete wall into a building or an elevator shaft. The same saw can be used to cut through the wall as is used to cut the opening after the initial aperture is cut. A separate set of tools and separate core bits are unnecessary, the chain-type saw functioning to make both types of apertures, cuts through the wall and cuts along the wall.

While the embodiment of FIGS. 5—9 is satisfactory for making both plunging cuts and linear cuts, it will be appreciated that there is some sacrifice in efficiency in making plunging cuts due to the fact that the profile of the teeth 117 is straight. This is, of course, necessary in order to make a linear cut with any degree of efficiency. However, where the saw is for emergency use, or plunging cuts are only occasionally made, the combined type of saw is satisfactory. Where there is a commercial type of operation involved, such as a contractor who has been hired to cut a series of openings, for example, doors in a building, it may be of advantage from the overall cost standpoint to have a sawlike device which is for the sole purpose of making a plunging cut which is a starting cut for the insertion of a saw which will make only linear cuts. This type of device can be essentially the same as the embodiment of FIGS. 5—9, but will be relatively short as compared to the bar 113 of the embodiment of FIGS. 5—9, and the chain will be correspondingly reduced in length. This is because it is only necessary to have the bar long enough to pass through a wall or the like to be cut in a direction perpendicular to the plane thereof. In addition, the tooth members have cutting portions having a curved profile with the same curvature as the cut to be made.

There has thus been provided a method of operating a chain saw having diamond impregnated teeth for enabling it to cut very hard materials easily and with efficiency and economy, and an apparatus for carrying out this method which is essentially a conventional chain saw which includes a means for directing a stream of liquid against and along the bar and run of the chain which is performing the cutting action in the direction in which this run of the chain is moving. The method and apparatus are both relatively simple, yet they enable these very desirable results to be achieved with little added expense in the production of the chain saw. The life of the chain is made sufficiently long so that it is economically feasible to use such chains, and the effort and time required for cutting such materials with such a saw is greatly reduced in comparison with prior art methods. The water which is used in the method and apparatus need only be at city water pressure, so that no special pressurizing equipment is needed.

It is thought that the invention and its advantages will be understood from the foregoing description, and is it apparent that various changes may be made in the form, construction and arrangement of the parts without departing from the spirit and scope of the invention or sacrificing its material advantages, the form hereinbefore described and illustrated in the drawings being merely a preferred embodiment thereof.

What I claim is:

1. A method of cutting very hard materials, such as concrete and the like, comprising running a chain of teeth having very hard particles projecting therefrom through the material to be cut, and flowing a low-pressure stream of liquid along and against the chain and substantially aligned with the direction of the movement of the chain at a point along the chain, the point being sufficiently ahead of the point where the chain acts on the material being cut, the speed of the chain being sufficient, and the direction of the stream of liquid being such that the liquid is clinging to the chain when it starts to cut, and the liquid, at the same time as it cools and lubricates the chain, sweeps particles of the material being cut from the kerf.

2. A method as claimed in claim 1 in which the liquid is water.

3. A chain saw for cutting very hard materials, said chain saw having motor means, a bar mounted on said motor means and having a groove therearound, a chain running in said grooves and being driven by said motor means, said chain having tooth members with very hard particles projecting therefrom, said groove and chain having at least one straight run which is adapted to act on the material to be cut, and means on said saw for flowing a low-pressure stream of liquid along and against the bar and chain a a point on said one straight run and substantially aligned with the direction of the movement of the chain along said straight run sufficiently ahead of where the chain contacts the material being cut that the liquid clings to the bar and reaches substantially the velocity of the chain and at the same time as it cools and lubricates the chain it sweeps particles of the material being cut from the kerf.

4. A chain saw as claimed in claim 3 in which said means comprise at least one conduit means adjacent the said straight run of said chain and directed at a slight angle to the direction of said straight run.

5. A chain saw as claimed in claim 3 in which said conduit means comprise two tubes, one on each side of said bar and just above the lower run thereof, and directed slightly inwardly toward said blade and slightly downwardly toward said chain.

6. A chain saw as claimed in claim 4 in which said saw has a nose housing around the nose of said blade, and said tubes are mounted on said nose housing.

7. A chain saw as claimed in claim 4 further comprising a nose wheel rotatably mounted at the nose end of said bar remote from said motor means and having a peripheral groove therein, said chain running around the groove in said nose wheel, said nose wheel being engaged by said chain so as to be driven thereby, and circular saw blades on opposite sides of said nose wheel and closely adjacent thereto and connected thereto for rotation therewith, said circular saw blades having teeth thereon with cutting portions with very hard particles projecting therefrom, the cutting portions having a radius substantially the same as the radius of points on the chain tooth members which lie along the profile of the chain tooth members as they move along said nose wheel.